(12) United States Patent
Kawamoto et al.

(10) Patent No.: US 12,252,802 B2
(45) Date of Patent: Mar. 18, 2025

(54) SURFACE-TREATED STEEL SHEET

(71) Applicant: NIPPON STEEL CORPORATION, Tokyo (JP)

(72) Inventors: Kosuke Kawamoto, Tokyo (JP); Yasuto Goto, Tokyo (JP); Yuta Dairokuno, Tokyo (JP); Koki Shimada, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 161 days.

(21) Appl. No.: 18/036,877

(22) PCT Filed: Nov. 29, 2021

(86) PCT No.: PCT/JP2021/043528
§ 371 (c)(1),
(2) Date: May 13, 2023

(87) PCT Pub. No.: WO2022/118770
PCT Pub. Date: Jun. 9, 2022

(65) Prior Publication Data
US 2023/0407509 A1 Dec. 21, 2023

(30) Foreign Application Priority Data
Dec. 3, 2020 (JP) .................. 2020-200746

(51) Int. Cl.
*C25D 5/12* (2006.01)
*C21D 9/46* (2006.01)
(Continued)

(52) U.S. Cl.
CPC ................ *C25D 5/12* (2013.01); *C21D 9/46* (2013.01); *C25D 3/12* (2013.01); *C25D 5/36* (2013.01);
(Continued)

(58) Field of Classification Search
None
See application file for complete search history.

(56) References Cited

U.S. PATENT DOCUMENTS

2010/0119836 A1* 5/2010 Naritomi ................ B32B 27/38
428/416
2013/0209864 A1 8/2013 Kuniya et al.
(Continued)

FOREIGN PATENT DOCUMENTS

CN 103119747 A 5/2013
EP 1787798 A2 * 5/2007 ............... B05D 5/02
(Continued)

*Primary Examiner* — Seth Dumbris
(74) *Attorney, Agent, or Firm* — Renner, Otto, Boisselle & Sklar, LLP

(57) ABSTRACT

A surface-treated steel sheet of the present disclosure includes a steel sheet, and an alloy layer containing Ni and Co on a surface of the steel sheet. A surface roughness Ra1 of the surface of the alloy layer over a sampling length of 5.0 mm in the width direction of the steel sheet is 2.0 μm or less. Ra2 that denotes the arithmetic mean height of a roughness curve of the surface of the alloy layer over a sampling length of 10 μm in the width direction of the steel sheet is 20 nm or less, and RSm that denotes the mean length of roughness curve elements over the sampling length of 10 μm in the width direction of the steel sheet is 700 nm or more, Ra2 and RSm being measured using an atomic force microscope.

3 Claims, 3 Drawing Sheets

(51) Int. Cl.
*C25D 3/12* (2006.01)
*C25D 5/36* (2006.01)
*C25D 5/50* (2006.01)

(52) U.S. Cl.
CPC ......... *C25D 5/50* (2013.01); *Y10T 428/12472* (2015.01); *Y10T 428/12993* (2015.01)

(56) References Cited

U.S. PATENT DOCUMENTS

| | | | |
|---|---|---|---|
| 2014/0050971 A1* | 2/2014 | Tomomori | ........... H01M 50/119 |
| | | | 429/176 |
| 2014/0147734 A1 | 5/2014 | Horie et al. | |
| 2020/0035960 A1 | 1/2020 | Nakano et al. | |
| 2020/0321566 A1 | 10/2020 | Nakano et al. | |
| 2021/0025071 A1 | 1/2021 | Saito et al. | |

FOREIGN PATENT DOCUMENTS

| | | | |
|---|---|---|---|
| WO | 2012/147843 A1 | 11/2012 | |
| WO | 2013/005774 A1 | 1/2013 | |
| WO | 2018/181950 A1 | 10/2018 | |
| WO | 2019/083044 A1 | 5/2019 | |
| WO | 2019/159794 A1 | 8/2019 | |

* cited by examiner

SURFACE-TREATED STEEL SHEET

TECHNICAL FIELD

The present disclosure relates to a surface-treated steel sheet.

BACKGROUND ART

A surface-treated steel sheet having nickel (Ni) plating on its surface is used as a surface-treated steel sheet for battery containers such as primary batteries and secondary batteries. For example, a common alkaline battery is manufactured as follows. First, a positive electrode can is manufactured by deep-drawing and pressing a surface-treated steel sheet into the shape of a battery container. Next, a conductive film, a positive electrode material, a separator, an electrolyte, a negative electrode material and a current collector are enclosed in the positive electrode can. In this way, an alkaline battery is manufactured. The positive electrode can function as a battery container and also functions as a current collector. The same also applies with respect to other types of batteries. The surface-treated steel sheet functions as a battery container and also functions as a current collector when connected to a negative electrode or a positive electrode.

On the other hand, the current required of a battery differs according to the intended application. A surface-treated steel sheet having an alloy layer on surface containing cobalt (Co) in addition to Ni is used for batteries for which a discharge with a large current (hereunder, also referred to as a "high-rate characteristic") is required. In comparison to Ni, Co is an active metal, and an oxide film of Co is not as strong as a passive film of Ni. Therefore, by containing Co in an alloy layer, the contact resistance between the surface-treated steel sheet and a positive electrode material or a negative electrode material decreases. By this means, the function of the surface-treated steel sheet as a current collector can be enhanced. As a result, the high-rate characteristic of the battery is enhanced.

Surface-treated steel sheets for a battery that each include an alloy layer containing Ni and Co on the surface thereof and which are capable of improving the high-rate characteristic of a battery are disclosed, for example, in International Application Publication No. WO2019/159794 (Patent Literature 1), International Application Publication No. WO2012/147843 (Patent Literature 2), International Application Publication No. WO 02019/083044 (Patent Literature 3) and International Application Publication No. WO2013/005774 (Patent Literature 4).

International Application Publication No. WO2019/159794 (Patent Literature 1) discloses a surface-treated steel sheet for a battery container that includes a Ni—Co—Fe-based diffusion alloy plating layer on at least one surface of a base steel sheet. The diffusion alloy plating layer is composed of, in order from the base steel sheet side, a Ni—Fe alloy layer and a Ni—Co—Fe alloy layer. In the diffusion alloy plating layer, the Ni coating weight is within a range of 3.0 g/m² or more to less than 8.74 g/m², the Co coating weight is within a range of 0.26 g/m² or more to 1.6 g/m² or less, and the total of the Ni coating weight and the Co coating weight is less than 9.0 g/m². When a surface of the diffusion alloy plating layer is analyzed using X-ray photoelectron spectroscopy, in atom %, Co is 19.5 to 60%, Fe is 0.5 to 30%, and Co+Fe is 20 to 70%. The thickness of the Ni—Fe alloy layer is within a range of 0.3 to 1.3 μm. It is described in Patent Literature 1 that, by this means, a surface-treated steel sheet for a battery container that is excellent in workability while maintaining battery characteristics and liquid leakage resistance is obtained.

International Application Publication No. WO2012/147843 (Patent Literature 2) discloses a surface-treated steel sheet for a battery container in which a nickel-cobalt alloy layer is formed at the outermost surface of a face that is to serve as the inner surface of a battery container. The surface-treated steel sheet for a battery container disclosed in Patent Literature 2 is characterized in that a Co/Ni value obtained by Auger electron spectroscopic analysis on the surface of the nickel-cobalt alloy layer is within a range of 0.1 to 1.5. It is described in Patent Literature 2 that, by this means, a surface-treated steel sheet for a battery container that is excellent in resistance to dissolving in alkaline solution, and that can secure high battery characteristics which are equal to or higher than those of conventional batteries even after the passage of time is obtained.

International Application Publication No. WO2019/083044 (Patent Literature 3) discloses a surface-treated steel sheet that includes a steel sheet and a nickel-cobalt-iron diffusion layer which is formed as an outermost outer layer on the steel sheet. In the surface-treated steel sheet disclosed in Patent Literature 3, when an Ni intensity, a Co intensity and an Fe intensity are measured consecutively in the depth direction from the surface side of the nickel-cobalt-iron diffusion layer by radio frequency glow discharge optical emission spectrometry, and a Ni content ratio, a Co content ratio and an Fe content ratio are determined based on the Ni intensity, the Co intensity and the Fe intensity, at a specific depth position D at which the Ni intensity is 0.5% with respect to a maximum value in the nickel-cobalt-iron diffusion layer, a Co content ratio $In_{Co\_D}$ is 5% by mass or more, and an Fe content ratio $In_{Fe\_D}$ is 11% by mass or more. It is described in Patent Literature 3 that, by this means, a surface-treated steel sheet is obtained that, when used as the battery container of a battery that uses a strong alkaline electrolyte, is excellent in battery characteristics and can suppress a decrease in the battery characteristics even after the passage of time.

International Application Publication No. WO2013/005774 (Patent Literature 4) discloses a surface-treated steel sheet for a battery container including a nickel-cobalt alloy layer formed at an outermost surface on a side which is to serve as the inner surface of a battery container, which is characterized in that when the nickel-cobalt alloy layer is subjected to X-ray diffraction measurement using CuKα as a radiation source, an intensity ratio $I_A/I_B$ that is a ratio of an intensity $I_A$ of a peak present at a diffraction angle 2θ within a range of 41° or more to less than 43° to an intensity $I_B$ of a peak present at a diffraction angle 2θ within a range of 43° or more to 45° or less is within a range of 0.01 to 0.9. It is described in Patent Literature 4 that, by this means, a surface-treated steel sheet for a battery container that can enhance the battery characteristics even when a conductive film is not formed is obtained.

CITATION LIST

Patent Literature

Patent Literature 1: International Application Publication No, WO02019/159794
Patent Literature 2: International Application Publication No. WO02012/147843
Patent Literature 3: International Application Publication No. WO02019/083044

Patent Literature 4: International Application Publication No. WO02013/005774

Patent Literature 5: International Application Publication No. WO02018/181950

SUMMARY OF INVENTION

Technical Problem

In this connection, after being produced, surface-treated steel sheets are stored for a fixed period of time until being used. It is preferable that even when a surface-treated steel sheet has been stored for a fixed period of time, a change in the color of the surface of the surface-treated steel sheet is suppressed.

A surface-treated metal sheet that can prevent a change in the color of the surface thereof even when the surface-treated metal sheet is stored for a long period of time and can also improve the battery characteristics when used as a battery container is disclosed, for example, in International Application Publication No. WO2018/181950 (Patent Literature 5). The surface-treated metal sheet disclosed in Patent Literature 5 includes a metal sheet and a nickel-cobalt binary alloy layer that is formed on the metal sheet, in which, when a portion having a content ratio of oxygen atoms of 5 atom % or more as measured by X-ray photo-electron spectroscopy is taken as an oxide film, the nickel-cobalt binary alloy layer includes an oxide film having a thickness of 0.5 to 30 nm on the surface thereof, and an amount of increase in the thickness of the oxide film is 28 nm or less when a pressure cooker test is performed that includes raising the temperature, holding for 72 hours under a water-vapor atmosphere at a temperature of 105° C. and a relative humidity of 100% RH, and decreasing the temperature.

On the other hand, it is preferable that change in the color of the surface of a surface-treated steel sheet can also be suppressed by a method that is different from the method disclosed in the aforementioned Patent Literature 5.

An objective to the present disclosure is to provide a surface-treated steel sheet which has low contact resistance and which can suppress the occurrence of a change in the color of the surface thereof.

Solution to Problem

A surface-treated steel sheet of the present disclosure includes:
a steel sheet, and
an alloy layer containing Ni and Co on a surface of the steel sheet,
wherein:
a surface roughness Ra1 of a surface of the alloy layer over a sampling length of 5.0 mm in a width direction of the steel sheet is 2.0 µm or less, the surface roughness Ra1 being as defined by JIS B0601 (2013) and measured using a stylus-type surface roughness meter; and
Ra2 that denotes an arithmetic mean height of a roughness curve of the surface of the alloy layer over a sampling length of 10 µm in the width direction of the steel sheet is 20 nm or less, and RSm that denotes a mean length of roughness curve elements of the surface of the alloy layer over a sampling length of 10 µm in the width direction of the steel sheet is 700 nm or more, Ra2 and RSm being measured using an atomic force microscope.

Advantageous Effect of Invention

The surface-treated steel sheet of the present disclosure has low contact resistance and can suppress the occurrence of a change in the color of the surface thereof.

DESCRIPTION OF EMBODIMENT

Figure 1:
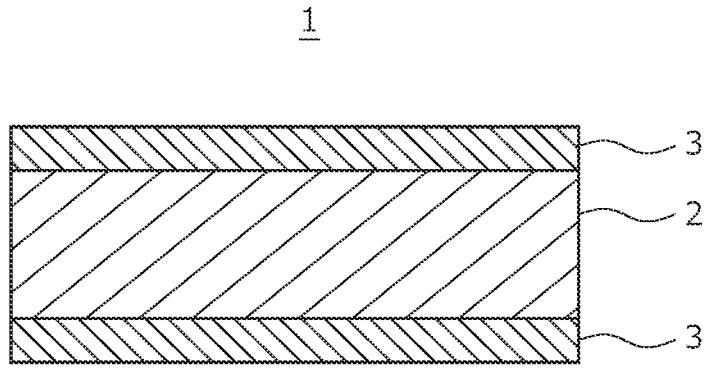
FIG. 1 is a cross-sectional diagram illustrating one example of a surface-treated steel sheet of the present embodiment.

As described above, a surface-treated steel sheet having an alloy layer containing nickel (Ni) and cobalt (co) on its surface has been proposed as a surface-treated steel sheet which is favorable for use as a battery container.

However, as a result of studies conducted by the present inventors it has been found that a surface-treated steel sheet including an alloy layer containing Co changes color under high temperature and high humidity conditions. The present inventors conducted detailed investigations to identify the cause of such a change in color, and obtained the following findings.

After being produced, surface-treated steel sheets are wound in a coil shape and stored. If high-temperature, high-humidity air is caught in a gap between surface-treated steel sheets in a coil during winding of the coil, condensation water will arise in the gap between the surface-treated steel sheets. Similarly, if high-temperature, high-humidity air enters a gap between surface-treated steel sheets in a coil during storage of the coil, condensation water will arise in the gap between the surface-treated steel sheets. At the surface of the surface-treated steel sheet, that is, at the alloy layer surface, the oxygen concentration of a portion which comes in contact with the condensation water will be high. In contrast, at the alloy layer surface, the oxygen concentration of a portion which does not come in contact with the condensation water will be low. The potential of the portion of the alloy layer surface where the oxygen concentration is high becomes noble. In contrast, the potential of the portion of the alloy layer surface where the oxygen concentration is low becomes "base". As a result, an oxygen concentration cell is formed. Co is more easily oxidized than Ni. Therefore, Co is oxidized at the portion where the oxygen concentration is low (in other words, the portion where the potential becomes "base"). The surface of the alloy layer changes color due to the oxidized Co.

A change in the color of the surface of the alloy layer is due to chemical reaction referred to as oxidation of Co. Therefore, when trying to suppress the occurrence of a change in the color of the surface of the alloy layer, it is generally attempted to suppress the occurrence of a change in the color of the surface of the alloy layer by adopting a chemical approach. For example, in the aforementioned Patent Literature 5, a change in the color of the surface of a surface-treated steel sheet is prevented by forming, on the surface thereof, an oxide coating film in which the amount of increase in thickness when a pressure cooker test is performed is 28 nm or less. In addition, it is also conceivable to suppress such a change in color by adjusting the ratio between Ni and Co, which is the cause of discoloration, in the alloy layer, or by adjusting the concentrations of Ni and Co in the alloy layer.

The present inventors have found that a change in color easily occurs in surface-treated steel sheets that are wound in a coil shape, and that deviations in the degree of color change are observed on the surface of the surface-treated steel sheets. Therefore, the present inventors considered that a change in the color of the surface of a surface-treated steel sheet can also be suppressed by a physical approach, instead of adopting a chemical approach. Specifically, the present inventors considered that unevenness of the surface of a surface-treated steel sheet influences a change in the color of the surface of the surface-treated steel sheet.

The present inventors then inferred as follows. When there is a large amount of unevenness on the surface of surface-treated steel sheets, the contact points between the surface-treated steel sheets that are together in a coil increase. In the vicinity of a contact point between surface-treated steel sheets, the distance between the surface-treated steel sheets is small. Therefore, condensation water which condensed in the vicinity of contact points between surface-treated steel sheets agglomerates due to capillary action. Therefore, the number of points where condensation water agglomerates increases in proportion to the number of contact points between the surface-treated steel sheets. If there are many points where condensation water agglomerates, an oxygen concentration cell is liable to be formed. Consequently, it will become easy for Co to be oxidized.

The present inventors considered that if the surface roughness of a surface-treated steel sheet can be reduced, even if the surface-treated steel sheet contains Co, a change in the color of the surface of the surface-treated steel sheet can be suppressed. Specifically, if the surface roughness of a surface-treated steel sheet is reduced, unevenness of the surface of the surface-treated steel sheet will decrease. When surface-treated steel sheets which have little unevenness are wound in a coil shape, the number of contact points between the surface-treated steel sheets in the coil decreases. If the number of contact points between surface-treated steel sheets is small, it will be difficult for condensation water which condensed in the vicinity of contact points between the surface-treated steel sheets to agglomerate due to capillary action. As a result, the occurrence of a change in the color of the surface of the surface-treated steel sheets can be suppressed. Hereinafter, performance that can suppress the occurrence of a change in the color of a surface is also referred to as "discoloration resistance", The present inventors conducted studies that focused on arithmetic surface roughness Ra that is one index of surface roughness.

Table 1 is an excerpt of the results of Examples that are described later. In a column described "Ra1 (µm)" in Table 1, the arithmetic mean roughness (hereinafter, also referred to as "surface roughness Ra1") of the surface of an alloy layer over a sampling length of 5.0 mm in the width direction of a steel sheet is shown. The surface roughness Ra1 is the arithmetic mean roughness as defined in JIS B0601 (2013). The surface roughness Ra1 was measured using a stylus-type surface roughness meter. The term "color difference ($\Delta E^*$)" in Table 1 refers to a difference in the color tone of the surface of the surface-treated steel sheet between before and after being exposed to high temperature and high humidity conditions. The larger that the value for the color difference ($\Delta E^*$) is, the greater the degree of color change in the surface of the surface-treated steel sheet after being exposed to high temperature and high humidity conditions that is indicated.

TABLE 1

| | Alloy Layer | | Surface of Alloy | Evaluation |
|---|---|---|---|---|
| Test No. | Ni Content ($g/m^2$) | Co Content ($g/m^2$) | Layer Ra1 (µm) | Results Color Difference ($\Delta E^*$) |
| 1 | 4.85 | 1.01 | 0.8 | 2.1 |
| 11 | 6.08 | 1.01 | 4.5 | 5.1 |
| 12 | 6.11 | 1.02 | 0.9 | 4.6 |

Referring to Table 1, in comparison to Test Number 11, in Test Number 1 the surface roughness Ra1 which was measured by a stylus-type surface roughness meter as defined by Japanese Industrial Standards (JIS) B0601 (2013) and JIS B0651 (2001) was small. Therefore, the color difference ($\Delta E^*$) in Test Number 1 was less than the color difference ($\Delta E^*$) in Test Number 11. In other words, the surface-treated steel sheet of Test Number 1 exhibited more excellent discoloration resistance than the surface-treated steel sheet of Test Number 11. However, in Test Number 12 in which, similarly to Test Number 1, the surface roughness Ra1 measured by a stylus-type surface roughness meter was small, the color difference ($\Delta E^*$) of the surface-treated steel sheet was 4.6, indicating that the surface-treated steel sheet of Test Number 12 was not excellent in discoloration resistance.

The possibility that the physical shape of the surface of a surface-treated steel sheet does not influence discoloration resistance has also been investigated. However, the present inventors considered that if even finer unevenness of the surface is reduced, the discoloration resistance of a surface-treated steel sheet can be increased.

In JIS B0651 (2001) the ideal shape of the stylus of a stylus-type surface roughness meter is a cone having a spherical tip, and the radius of the stylus tip is a minimum of 2 µm. Accordingly, the stylus-type surface roughness meter cannot detect a groove which is smaller than the radius (2 µm) of the spherical portion of the tip of the stylus. Therefore, even when the surface roughness Ra1 that is measured with the stylus-type surface roughness meter is small, there are cases where the surface has even finer unevenness. At a convex portion of fine unevenness, condensation water agglomerates due to capillary action. At the surface of an alloy layer which is covered by agglomerated condensation water, a dissolved oxygen concentration at a center part of the condensation water is lower than at a peripheral part of the condensation water. Hence, an oxygen concentration cell is formed. As a result, a reduction reaction proceeds at the peripheral part of the condensation water. On the other hand, an oxidation reaction proceeds at the center part of the condensation water. As a result, Co is oxidized.

The present inventors therefore conducted studies regarding finer surface roughness that cannot be measured with a stylus-type surface roughness meter. As a result, the present inventors found that in addition to Ra1 that is measured by a stylus-type surface roughness meter, if a surface roughness Ra2 that is measured by an atomic force microscope (AFM) is made small and, furthermore, RSm that is the mean length of roughness curve elements over the sampling length measured by the AFM is made large, discoloration resistance of the surface-treated steel sheet can be suppressed. By making the fine surface roughness Ra2 small, fine convex portions decrease. By this means, spots where condensation water agglomerates decrease. In other words, spots where an oxygen concentration cell is formed and Co oxidation is promoted decrease. As a result, oxidation of Co can be suppressed. Further, when RSm that denotes the mean length of roughness curve elements over the sampling length is large, it means that the number of concavities and convexities is small. In other words, when RSm is made large, fine convex portions decrease. As a result, spots where condensation water agglomerates decrease. In other words, spots where an oxygen concentration cell is formed and Co oxidation is promoted decrease. As a result, oxidation of Co can be suppressed.

Table 2 is an excerpt of the results of Examples that are described later. Table 2 is a table in which Ra2 (nm) and RSm (nm) are further added to the results in Table 1. In Table 2, in the column described "Ra2 (nm)", the arithmetic mean height (nm) of a roughness curve of the surface of the alloy layer over a sampling length of 10 μm in the width direction of the steel sheet, which was measured using an AFM is shown (hereinafter, also referred to as "surface roughness Ra2"). In Table 2, in the column described "RSm (nm)", the mean length (nm) of roughness curve elements of the surface of the alloy layer over a sampling length of 10 μm in the width direction of the steel sheet, which was measured using an AFM is shown (hereinafter, also referred to as "mean length of roughness RSm").

TABLE 2

| Test No. | Alloy Layer | | Surface of Alloy Layer | | | Evaluation Results |
|---|---|---|---|---|---|---|
| | Ni Content (g/m$^2$) | Co Content (g/m$^2$) | Ra1 (μm) | Ra2 (nm) | RSm (nm) | Color Difference (ΔE*) |
| 1 | 4.85 | 1.01 | 0.8 | 17 | 924 | 2.1 |
| 11 | 6.08 | 1.01 | 4.5 | 28 | 468 | 5.1 |
| 12 | 6.11 | 1.02 | 0.9 | 25 | 557 | 4.6 |

Referring to Table 2, in comparison to Test Number 11 and Test Number 12, in Test Number 1 the surface roughness Ra2 measured by an atomic force microscope (AFM) was small, and the mean length of roughness RSm was large. Therefore, the color difference (ΔE*) of Test Number 1 was smaller than the color difference (ΔE*) of Test Number 11 and Test Number 12. In other words, the surface-treated steel sheet of Test Number 1 exhibited more excellent discoloration resistance than the surface-treated steel sheet of Test Number 11 and Test Number 12.

Although the findings described above include an inference, it is demonstrated in the Examples that in a surface-treated steel sheet having the structure of claim 1 of the present disclosure, contact resistance is low and the occurrence of a change in the color of the surface can be suppressed.

The surface-treated steel sheet of the present disclosure has been completed based on the above findings, and is as follows.

[1]
A surface-treated steel sheet including:
a steel sheet, and
an alloy layer containing Ni and Co on a surface of the steel sheet,
wherein:
a surface roughness Ra1 of a surface of the alloy layer over a sampling length of 5.0 mm in a width direction of the steel sheet is 2.0 μm or less, the surface roughness Ra1 being as defined by JIS B0601 (2013) and measured using a stylus-type surface roughness meter; and
Ra2 that denotes an arithmetic mean height of a roughness curve of the surface of the alloy layer over a sampling length of 10 μm in the width direction of the steel sheet is 20 nm or less, and RSm that denotes a mean length of roughness curve elements of the surface of the alloy layer over a sampling length of 10 μm in the width direction of the steel sheet is 700 nm or more, Ra2 and RSm being measured using an atomic force microscope.

[2]
The surface-treated steel sheet according to [1], wherein:
per side of the steel sheet, a content of Ni in the alloy layer is 1.34 to 5.36 g/m$^2$, and a content of Co in the alloy layer is 0.45 to 1.34 g/m$^2$.

[3]
The surface-treated steel sheet according to [1], wherein:
per side of the steel sheet, a content of Ni in the alloy layer is 5.36 to 35.6 g/m$^2$, and a content of Co in the alloy layer is 0.45 to 1.34 g/m$^2$.

Hereunder, the surface-treated steel sheet of the present embodiment is described in detail.

[Surface-Treated Steel Sheet]

Figure 2:
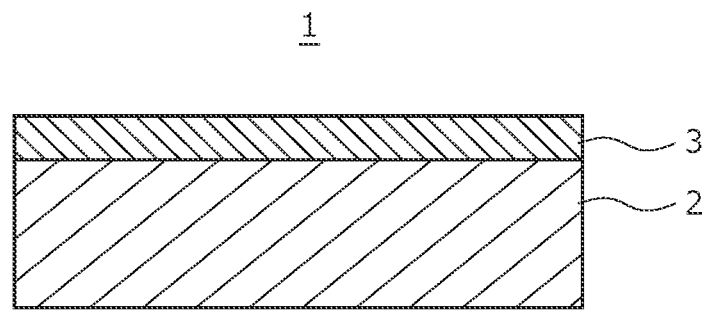
FIG. 2 is a cross-sectional diagram illustrating one example of a surface-treated steel sheet of another embodiment that is different from the example in FIG. 1.

A surface-treated steel sheet of the present embodiment includes a steel sheet, and an alloy layer containing Ni and Co on the steel sheet surface. FIG. 1 is a cross-sectional diagram illustrating one example of the surface-treated steel sheet of the present embodiment. Referring to FIG. 1, a surface-treated steel sheet 1 of the present embodiment includes a steel sheet 2 and an alloy layer 3. The alloy layer 3 is arranged on a surface of the steel sheet 2. In FIG. 1, the alloy layer 3 is arranged on both sides of the steel sheet 2. However, the arrangement of the alloy layer 3 is not limited to the example illustrated in FIG. 1. As illustrated in FIG. 2, the alloy layer 3 may be arranged on only one side of the steel sheet 2.

Figure 3:
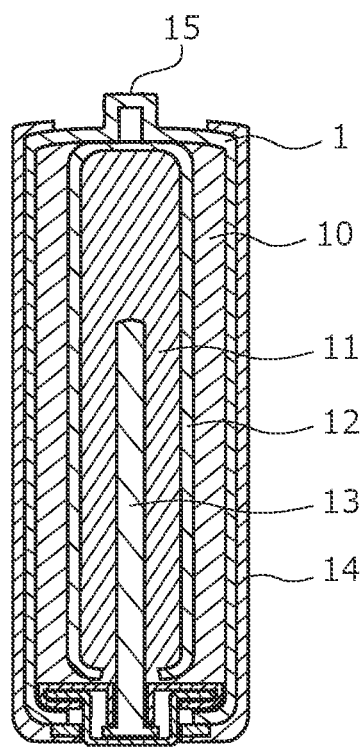
FIG. 3 is a cross-sectional diagram illustrating an example of an alkaline battery which uses the surface-treated steel sheet of the present embodiment.

The surface-treated steel sheet 1 of the present embodiment can be used for battery applications, such as for primary batteries and secondary batteries. The term "primary battery" refers to, for example, an alkaline battery and a manganese battery. The term "secondary battery" refers to, for example, a lithium ion battery. FIG. 3 is a cross-sectional diagram illustrating an example of an alkaline battery which uses the surface-treated steel sheet 1 of the present embodiment. Referring to FIG. 3, the surface-treated steel sheet 1 is processed into the shape of a battery container. A manganese dioxide 10 that is the positive electrode, zinc 11 that is the negative electrode, a separator 12, and a current collector 13 are enclosed inside the container formed of the surface-treated steel sheet 1. The positive electrode 10 and the negative electrode 11 are immersed in an electrolyte. The outer side of the container formed by the surface-treated steel sheet 1 is covered with an insulator 14. A protrusion at the top part of the alkaline battery in FIG. 3 is a positive electrode terminal 15. When used as a battery container, the surface-treated steel sheet 1 functions as a battery container and as a current collector. In a case where the alloy layer 3 is arranged on only one side of the steel sheet 2, it is preferable that the alloy layer 3 is arranged on the inner side of the battery container.

[Preferable Thickness of Surface-Treated Steel Sheet]

Although the thickness of the surface-treated steel sheet 1 of the present embodiment is not particularly limited, for example the thickness is 0.05 to 1.5 mm. In the case of use for a battery such as an alkaline battery, for example, the thickness is 0.1 to 1.0 mm. The thickness of the surface-treated steel sheet 1 can be measured by a well-known method. The thickness of the surface-treated steel sheet 1, for example, may be measured by cutting the surface-treated steel sheet 1 in the thickness direction and performing measurement by observing an obtained cross section using an optical microscope, or may be measured using a well-known film thickness gauge.

[Alloy Layer]

The alloy layer 3 contains Ni and Co. The alloy layer 3 may also contain iron (Fe). For example, the alloy layer 3 can be produced by the following production method. First, the steel sheet 2 is prepared. Next, a Ni plating layer is formed on the surface of the steel sheet 2, and a Co plating layer is formed on the Ni plating layer. Lastly, the steel sheet 2 including the Ni plating layer and the Co plating layer is subjected to an alloying heat treatment. The alloying heat treatment causes Ni in the Ni plating layer and Co in the Co plating layer to diffuse with each other, thereby forming the alloy layer 3. At such time, iron (Fe) contained in the steel sheet 2 may diffuse into the alloy layer 3. Therefore, the alloy layer 3 may contain Fe in addition to Ni and Co. Each of the Ni, Co and Fe may be partially present in the thickness direction of the alloy layer 3, or may be present over the entire thickness direction of the alloy layer 3. In other words, in the surface-treated steel sheet 1 of the present embodiment, all of Ni, Co and Fe need not be constantly contained over the whole area in the thickness direction of the alloy layer 3.

[Surface Roughness Ra1 of Alloy Layer]

The surface roughness Ra1 of the surface of the alloy layer 3 over a sampling length of 5.0 mm in the width direction of the steel sheet 2 as defined in JIS B0601 (2013) that is measured using a stylus-type surface roughness meter is 2.0 µm or less. Here, the term "width direction of the steel sheet 2" refers to a direction that is perpendicular to both the rolling direction of the steel sheet 2 and the thickness direction of the steel sheet. When the surface roughness Ra1 of the alloy layer 3 is 2.0 µm or less, contact points between the surface-treated steel sheets 1 that are wound in a coil shape decrease. Therefore, even in a high temperature and high humidity environment, points where condensation water agglomerates due to capillary action in gaps between the surface-treated steel sheets 1 that are wound in a coil shape decrease, and places where oxygen concentration cells form decrease. Therefore, the discoloration resistance of the surface-treated steel sheet 1 increases.

A preferable upper limit of the surface roughness Ra1 of the alloy layer 3 is 1.9 µm, more preferably is 1.8 µm, further preferably is 1.5 µm, further preferably is 1.3 µm, and further preferably is 1.0 µm. Although the lower limit of the surface roughness Ra1 of the alloy layer 3 is not particularly limited, if the surface roughness Ra1 of the alloy layer 3 is extremely reduced, the cost will increase. Therefore, the lower limit of the surface roughness Ra1 of the alloy layer 3 is preferably 0.1 µm, more preferably is 0.2 µm, further preferably is 0.5 µm, and further preferably is 0.8 µm.

[Method for Measuring Surface Roughness Ra1 of Alloy Layer]

The surface roughness Ra1 of the alloy layer 3 is measured by the following method. First, the surface-treated steel sheet 1 including the alloy layer 3 is prepared. A stylus-type surface roughness meter that is defined in JIS B0651 (2001) is used for the measurement. Based on JIS B0601 (2013), the arithmetic mean roughness Ra of the alloy layer 3 surface is measured over a sampling length of 5.0 mm in the width direction of the steel sheet 2. The term "width direction of the steel sheet 2" refers to a direction that is perpendicular to both the rolling direction of the steel sheet 2 and the thickness direction of the steel sheet 2. The obtained result is defined as the surface roughness Ra1 of the alloy layer 3.

[Surface Roughness Ra2 of Alloy Layer]

On the surface of the alloy layer 3, Ra2 that denotes the arithmetic mean height of a roughness curve over a sampling length of 10 µm in the width direction of the steel sheet 2 that is measured using an atomic force microscope (AFM) is 20 nm or less. Here, the term "width direction of the steel sheet 2" refers to a direction that is perpendicular to both the rolling direction of the steel sheet 2 and the thickness direction of the steel sheet. When the surface roughness Ra2 of the alloy layer 3 is 20 nm or less, fine convex portions decrease. By this means, spots where condensation water agglomerates decrease. In other words, spots where an oxygen concentration cell is formed and Co oxidation is promoted decrease. As a result, the discoloration resistance of the surface-treated steel sheet 1 increases.

A preferable upper limit of the surface roughness Ra2 of the alloy layer 3 is 19 nm, more preferably is 18 nm, further preferably is 17 nm, further preferably is 16 nm, and further preferably is 15 nm. Although the lower limit of the surface roughness Ra2 of the alloy layer is not particularly limited, if the surface roughness Ra2 of the alloy layer 3 is extremely reduced, the cost will increase. Therefore, the lower limit of the surface roughness Ra2 of the alloy layer 3 is preferably 1 nm, more preferably is 2 nm, further preferably is 3 nm, further preferably is 4 nm, further preferably is 5 nm, and further preferably is 10 nm.

[Mean Length of Roughness RSm of Alloy Layer]

On the surface of the alloy layer 3, RSm that denotes the mean length of roughness curve elements over a sampling length of 10 µm in the width direction of the steel sheet 2 that is measured using an atomic force microscope (AFM) (hereinafter, also referred to as "mean length of roughness RSm of the alloy layer 3") is 700 nm or more. Here, the term "width direction of the steel sheet 2" refers to a direction that is perpendicular to both the rolling direction of the steel sheet 2 and the thickness direction of the steel sheet. When the mean length of roughness RSm of the alloy layer 3 is 700 nm or more, fine convex portions decrease. By this means, spots where condensation water agglomerates decrease. In other words, spots where an oxygen concentration cell is formed and Co oxidation is promoted decrease. As a result, the discoloration resistance of the surface-treated steel sheet 1 increases.

A preferable lower limit of the mean length of roughness RSm of the alloy layer 3 is 720 nm, more preferably is 750 nm, further preferably is 780 nm, further preferably is 800 nm, further preferably is 850 nm, further preferably is 900 nm, further preferably is 950 nm, and further preferably is 1000 nm. Although the upper limit of the mean length of roughness RSm of the alloy layer 3 is not particularly limited, if the mean length of roughness RSm of the alloy layer 3 is made extremely large, the cost will increase.

Therefore, the upper limit of the mean length of roughness RSm of the alloy layer 3 is preferably 5000 nm, more preferably is 4000 nm, further preferably is 3000 nm, further preferably is 2000 nm, and further preferably is 1500 nm.

[Method for Measuring Surface Roughness Ra2 of Alloy Layer and Mean Length of Roughness RSm of Alloy Layer]

The surface roughness Ra2 of the alloy layer 3 and the mean length of roughness RSm of the alloy layer 3 are measured by the following method. The surface-treated steel sheet 1 including the alloy layer 3 is prepared. An atomic force microscope (AFM) is used to perform the measurement. The measurement conditions are set as follows: measurement in the atmosphere; scan size: vertical 2 μm and horizontal 2 μm; and dynamic mode AFM. The arithmetic mean height of the roughness curve over a sampling length of 10 μm in the width direction of the steel sheet 2 is determined. The term "width direction of the steel sheet 2" refers to a direction that is perpendicular to both the rolling direction of the steel sheet 2 and the thickness direction of the steel sheet 2. The arithmetic mean height of the roughness curve is determined according to the same method as the method for determining the arithmetic mean height of a roughness curve that is defined in JIS B0601 (2013). The obtained result is defined as the surface roughness Ra2 of the alloy layer. Further, the mean length of roughness curve elements over the aforementioned sampling length of 10 μm is determined. The mean length of the roughness curve elements is determined according to the same method as the method for determining the mean length of roughness curve elements that is defined in JIS B0601 (2013). The obtained result is defined as the mean length of roughness RSm of the alloy layer.

[Thickness of Alloy Layer]

The thickness of the alloy layer 3 is not particularly limited. A lower limit of the thickness of the alloy layer 3 is, for example, 100 nm. An upper limit of the thickness of the alloy layer 3 is, for example, 1000 nm. Here, the term "thickness of the alloy layer 3" refers to a thickness that is measured by visual observation when the surface-treated steel sheet 1 is cut in the thickness direction and a resulting cross section is observed using a scanning electron microscope.

Hereunder, a case where Fe is diffused up to the surface of the alloy layer 3 is also referred to as "complete diffusion". Further, a case where Fe is not diffused up to the surface of the alloy layer 3 is also referred to as "partial diffusion". In the alloy layer 3 of the surface-treated steel sheet 1 of the present embodiment, Fe may be completely diffused or may be partially diffused.

[Preferable Content of Ni and Preferable Content of Co in Alloy Layer]

Preferably, the content of Ni and the content of Co in the alloy layer 3 per side of the steel sheet 2 are as follows.

Content of Ni in alloy layer 3: 1.34 to 35.6 g/m$^2$

If the content of Ni in the alloy layer 3 is 1.34 g/m$^2$ or more, an anti-rust property of the surface-treated steel sheet 1 can be more reliably ensured. On the other hand, the necessity for the content of Ni in the alloy layer 3 to be more than 35.6 g/m$^2$ is low since the anti-rust property of the surface-treated steel sheet 1 can be adequately ensured even if the content is more than 35.6 g/m$^2$. If the content of Ni in the alloy layer 3 is 35.6 g/m$^2$ or less, the production cost can be suppressed. Therefore, the content of Ni in the alloy layer 3 is preferably 1.34 to 35.6 g/m$^2$. A more preferable lower limit of the content of Ni in the alloy layer 3 is 2.01 g/m$^2$, and further preferably is 2.75 g/m$^2$. A more preferable upper limit of the content of Ni in the alloy layer 3 is 31.8 g/m$^2$, and further preferably is 28.9 g/m$^2$.

Content of Co in alloy layer 3: 0.45 to 1.34 g/m$^2$

If the content of Co in the alloy layer 3 is 0.45 g/m$^2$ or more, the contact resistance of the surface-treated steel sheet 1 can be more stably lowered. On the other hand, even if the content of Co in the alloy layer 3 is more than 1.34 g/m$^2$, the low contact resistance of the alloy layer 3 can be adequately ensured. If the content of Co in the alloy layer 3 is 1.34 g/m$^2$ or less, the production cost can be suppressed. Therefore, the content of Co in the alloy layer 3 is preferably 0.45 to 1.34 g/m$^2$. A more preferable lower limit of the content of Co in the alloy layer 3 is 0.52 g/m$^2$, and further preferably is 0.65 g/m$^2$. A more preferable upper limit of the content of Co in the alloy layer 3 is 1.23 g/m$^2$, and further preferably is 1.10 g/m$^2$.

[Preferable Content of Ni and Preferable Content of Co in Alloy Layer in Case of Complete Diffusion]

In the case of complete diffusion, the preferable content of Ni and the preferable content of Co in the alloy layer per side of the steel sheet 2 are preferably as follows.

Content of Ni in alloy layer 3 in case of complete diffusion: 1.34 to 5.36 g/m$^2$ If the content of Ni in the alloy layer 3 is 1.34 g/m$^2$ or more, an anti-rust property of the surface-treated steel sheet 1 can be more reliably ensured. On the other hand, if the content of Ni in the alloy layer 3 is 5.36 g/m$^2$ or less, it is easy for Fe to diffuse up to the surface of the alloy layer 3. Therefore, in the case of complete diffusion, the content of Ni in the alloy layer 3 is preferably 1.34 to 5.36 g/m$^2$. In the case of complete diffusion, a more preferable lower limit of the content of Ni in the alloy layer 3 is 1.78 g/m$^2$, and further preferably is 2.10 g/m$^2$. In the case of complete diffusion, a more preferable upper limit of the content of Ni in the alloy layer 3 is 5.10 g/m$^2$, and further preferably is 4.85 g/m$^2$.

Content of Co in alloy layer 3 in case of complete diffusion: 0.45 to 1.34 g/m$^2$ If the content of Co in the alloy layer 3 is 0.45 g/m$^2$ or more, the contact resistance of the surface-treated steel sheet 1 can be more stably lowered. On the other hand, even if the content of Co in the alloy layer 3 is more than 1.34 g/m$^2$, the low contact resistance of the alloy layer 3 can be adequately ensured. If the content of Co in the alloy layer 3 is 1.34 g/m$^2$ or less, the production cost can be suppressed. Therefore, in the case of complete diffusion, the content of Co in the alloy layer 3 is preferably 0.45 to 1.34 g/m$^2$. In the case of complete diffusion, a more preferable lower limit of the content of Co in the alloy layer 3 is 0.55 g/m$^2$, and further preferably is 0.65 g/m$^2$. In the case of complete diffusion, a more preferable upper limit of the content of Co in the alloy layer 3 is 1.22 g/m$^2$, and further preferably is 1.10 g/m$^2$.

[Preferable Content of Ni and Preferable Content of Co in Alloy Layer in Case of Partial Diffusion]

In the case of partial diffusion, the preferable content of Ni and the preferable content of Co in the alloy layer per side of the steel sheet 2 are preferably as follows.

Content of Ni in alloy layer 3 in case of partial diffusion: 5.36 to 35.6 g/m$^2$ If the content of Ni in the alloy layer 3 is 5.36 g/m$^2$ or more, it will be difficult for Fe to diffuse up to the surface of the alloy layer 3. On the other hand, the necessity for the content of Ni in the alloy layer 3 to be more than 35.6 g/m$^2$ is low since the anti-rust property of the surface-treated steel sheet 1 can be adequately ensured even if the content is more than 35.6 g/m$^2$. If the content of Ni in the alloy layer 3 is 35.6 g/m$^2$ or less, the production cost can be suppressed. Therefore, in the case of partial diffusion, the content of Ni in the alloy layer 3 is preferably 5.36 to 35.6 g/m². In the case of partial diffusion, a more preferable lower limit of the content of Ni in the alloy layer 3 is 5.70 g/m², and further preferably is 6.00 g/m². In the case of partial diffusion, a more preferable upper limit of the content of Ni in the alloy layer 3 is 32.5 g/m², and further preferably is 28.9 g/m².

Content of Co in alloy layer 3 in case of partial diffusion: 0.45 to 1.34 g/m²

If the content of Co in the alloy layer 3 is 0.45 g/m² or more, the contact resistance of the surface-treated steel sheet 1 can be more stably lowered. On the other hand, even if the content of Co in the alloy layer 3 is more than 1.34 g/m², the low contact resistance of the alloy layer 3 can be adequately ensured. If the content of Co in the alloy layer 3 is 1.34 g/m² or less, the production cost can be suppressed. Therefore, in the case of partial diffusion, the content of Co in the alloy layer 3 is preferably 0.45 to 1.34 g/m². In the case of partial diffusion, a more preferable lower limit of the content of Co in the alloy layer 3 is 0.55 g/m², and further preferably is 0.65 g/m². In the case of partial diffusion, a more preferable upper limit of the content of Co in the alloy layer 3 is 1.22 g/m², and further preferably is 1.10 g/m².

The chemical composition of the alloy layer 3 of the surface-treated steel sheet 1 of the present embodiment may be a chemical composition consisting of Co, Ni, Fe and impurities. The impurities are, for example, one or more elements selected from the group consisting of carbon (C), oxygen (O), aluminum (Al), silicon (Si), phosphorus (P), manganese (Mn), copper (Cu) and sulfur (S).

[Method for Measuring Content of Ni and Content of Co in Alloy Layer]

A preferable content of Ni and a preferable content of Co in the alloy layer 3 are measured by the following method. The surface-treated steel sheet 1 including the alloy layer 3 is prepared. The surface-treated steel sheet 1 is cut in the thickness direction, a resulting cross section is observed using a scanning electron microscope, and the thickness of the alloy layer 3 is measured. Next, a sample having a predetermined area is extracted from the surface of the surface-treated steel sheet 1. The thickness of the sample is made the same thickness as the thickness of the alloy layer 3 determined earlier. The obtained sample is dissolved in a mixed acid of concentrated hydrochloric acid: concentrated nitric acid=1:1 at 25° C. The time of the dissolution treatment is set according to the thickness of the alloy layer 3 determined earlier and the size of the sample. The obtained solution is analyzed by high-frequency inductively coupled plasma (ICP) emission spectrometry. The content of Ni (g/m²) and the content of Co (g/m²) in the alloy layer 3 are determined based on the obtained results and the area of the sample.

[Impedance]

An impedance value ($\Omega$) of the surface-treated steel sheet 1 of the present embodiment is preferably 50 ($\Omega$) or less. Here, the term "impedance value ($\Omega$)" refers to an impedance value ($\Omega$) at a frequency of 0.1 Hz, which is measured after the surface-treated steel sheet 1 is held at a constant potential for 10 days at 0.3 V vs. Hg/HgO in a 35% KOH aqueous solution at 60° C. The upper limit of the impedance value ($\Omega$) is more preferably 45, further preferably is 40, further preferably is 30, further preferably is 20, further preferably is 10, and further preferably is 5. The lower limit of the impedance value ($\Omega$) is not particularly limited, and for example is 1.

[Color Difference]

A color difference ($\Delta E^*$) of the surface-treated steel sheet 1 of the present embodiment is preferably 4.5 or less. Here, the term "color difference ($\Delta E^*$)" refers to a color difference ($\Delta E^*$) determined based on L*a*b* values obtained before and after holding the surface-treated steel sheet 1 at a temperature of 40° C. and a humidity of 90% rh for 10 days. The upper limit of the color difference ($\Delta E^*$) is more preferably 4.3, further preferably 4.0, further preferably 3.8, further preferably 3.5, further preferably 3.3, further preferably 3.0, further preferably 2.7, further preferably 2.5, further preferably 2.3, further preferably 2.1, further preferably 2.0, further preferably 1.9, and further preferably 1.6. The lower limit of the color difference ($\Delta E^*$) is not particularly limited, and for example is 0.

[Steel Sheet]

The chemical composition of the steel sheet 2 is not particularly limited. The steel sheet 2 may be selected, for example, from the group consisting of low carbon steel containing carbon (C) in an amount of 0.25 in percent by mass or less, ultra-low carbon steel containing carbon (C) in an amount of less than 0.01 in percent by mass, and non-aging ultra-low carbon steel obtained by adding Ti and Nb to an ultra-low carbon steel. Cold-rolled steel sheets made of low carbon steel are, for example, defined as SPCC, SPCD, SPCE, SPCF and SPCG in JIS G3141 (2017). The steel sheet 2 may be any of these cold-rolled steel sheets. Further, the steel sheet 2 may be aluminum-killed steel.

As described above, the surface-treated steel sheet 1 of the present embodiment includes the steel sheet 2, and the alloy layer 3 containing Ni and Co on a surface of the steel sheet 2. The surface roughness Ra1 of the surface of the alloy layer 3 over a sampling length of 5.0 mm in the width direction of the steel sheet 2 is 2.0 μm or less, the surface roughness Ra1 being as defined in HS B0601 (2013) and measured using a stylus-type surface roughness meter, Ra2 that denotes an arithmetic mean height of a roughness curve of the surface of the alloy layer 3 over a sampling length of 10 μm in the width direction of the steel sheet 2 is 20 nm or less, and RSm that denotes a mean length of roughness curve elements of the surface of the alloy layer 3 over a sampling length of 10 μm in the width direction of the steel sheet 2 is 700 nm or more, Ra2 and RSm being measured using an atomic force microscope. Therefore, in the surface-treated steel sheet 1 of the present embodiment, the contact resistance is low and a change in the color of the surface can be suppressed.

[Production Method]

A method for producing the aforementioned surface-treated steel sheet 1 of the present embodiment will now be described. The method for producing the surface-treated steel sheet 1 described hereunder is one example of a method for producing the surface-treated steel sheet 1 of the present embodiment. Accordingly, the surface-treated steel sheet 1 composed as described above may be produced by another production method that is different from the production method described hereunder. However, the production method described hereunder is a preferable example of a method for producing the surface-treated steel sheet 1 of the present embodiment.

The method for producing the surface-treated steel sheet 1 of the present embodiment includes a process of preparing the steel sheet 2 (steel sheet preparation process), a process of forming an Ni plating layer of a surface of the steel sheet 2 (Ni plating process), a process of forming a Co plating layer on the Ni plating layer (Co plating process), a process of subjecting the steel sheet 2 having the Ni plating layer and the Co plating layer to an alloying heat treatment (alloying heat treatment process), and a process of subjecting the steel sheet 2 that underwent the alloying heat treatment to temper rolling (temper rolling process). Each of these processes is described hereunder.

[Steel Sheet Preparation Process]

In the steel sheet preparation process, the aforementioned steel sheet 2 is prepared. The steel sheet 2 may be supplied by a third party or may be produced. In the case of producing the steel sheet 2, for example, the steel sheet 2 is produced by the following method. Molten steel having the aforementioned chemical composition is produced. The produced molten steel is used to produce a cast piece. The produced cast piece is subjected to hot rolling, pickling, and cold rolling. Annealing and temper rolling may be performed after the cold rolling. The steel sheet 2 can be produced by the above process. The thickness of the steel sheet 2 is not particularly limited, and is selected according to the intended use of the surface-treated steel sheet 1. The thickness of the steel sheet 2 is, for example, 0.05 to 1.5 mm. In a case where the intended use is for a battery such as an alkaline battery, for example, the thickness is 0.1 to 1.0 mm.

[Ni Plating Process]

In the Ni plating process, an Ni plating layer consisting of Ni and impurities is formed on the surface of the steel sheet 2. Specifically, the steel sheet 2 is brought into contact with an Ni plating bath, and electroplating or electroless plating is performed. The Ni plating process may be performed by immersing the steel sheet 2 in an Ni plating bath and performing electroplating. A well-known Ni plating bath can be used as the Ni plating bath. The Ni plating bath, for example, is selected from the group consisting of a Watts bath, a sulfamate bath, a Wood's bath, a borofluoride bath, a chloride bath and a citrate bath. The Ni plating bath contains Ni ions. The content of Ni ions is, for example, 50 to 500 g/L. The Ni ions may be added to the Ni plating bath as one or more kinds selected from the group consisting of nickel sulfate, ammonium nickel sulfate, nickel chloride, nickel sulfamate and metallic nickel. The Ni plating bath may contain other components in addition to Ni ions. The other components are, for example, one or more kinds selected from the group consisting of boric acid, hydrochloric acid, zinc sulfate, sodium thiocyanate, citric acid, a brightener, a pH adjustor and a surface active agent. The other components are set as appropriate according to the type of Ni plating bath.

The plating conditions such as the Ni plating bath temperature, the pH of the Ni plating bath, and the Ni plating treatment time can be set as appropriate. For example, plating may be performed under conditions of an Ni plating bath temperature of 25 to 70° C. and a pH of the Ni plating bath of 1 to 5. In the case of electroplating, plating may be performed under conditions of a current density of 1 to 50 A/dm$^2$, and an Ni plating treatment time of 1 to 300 seconds. By setting the current density to 1 A/dm$^2$ or more, a preferable Ni coating weight is easily obtained. By setting the current density to 50 A/dm$^2$ or less, plating surface burns and the like can be prevented.

In the Ni plating layer formation process, for example, a Watts bath containing nickel (II) sulfate hexahydrate: 250 to 380 g/L, nickel (II) chloride hexahydrate: 0.40 to 80 g/L, and boric acid: 20 to 55 g/L may be used. Using this Watts bath, electroplating may be performed under conditions in which the pH of the Ni plating bath is 3.5 to 4.5, the Ni plating bath temperature is 45 to 55° C., the current density is 1 to 40 A/dm$^2$, and the Ni plating treatment time is 1 to 100 seconds. By this means, an Ni plating layer consisting of Ni and impurities can be formed on the surface of the steel sheet 2.

The Ni coating weight of the Ni plating layer is the same as the aforementioned content of Ni in the alloy layer 3. In other words, preferably the plating conditions are adjusted so that the Ni coating weight per side of the steel sheet 2 falls within the range of 1.34 to 35.6 g/m$^2$. In a case where Fe is to be completely diffused in the alloy layer 3, preferably the Ni coating weight is 1.34 to g/m$^2$. In a case where Fe is to be partially diffused in the alloy layer 3, preferably the Ni coating weight is 5.36 to 35.6 g/m$^2$.

[Co Plating Process]

In the Co plating process, a Co plating layer consisting of Co and impurities is formed on the Ni plating layer. Specifically, the Ni plating layer on the surface of the steel sheet 2 is brought into contact with a Co plating bath, and electroplating is performed. The steel sheet 2 having the Ni plating layer may be immersed in a Co plating bath to perform electroplating. A commercially available Co plating bath can be used as the Co plating bath. The Co plating bath contains Co ions. The content of Co ions is, for example, 30 to 500 g/L. The Co ions may be added to the Co plating bath as one or more kinds selected from the group consisting of cobalt sulfate and cobalt chloride. The Co plating bath may contain other components in addition to Co ions. The other components are, for example, one or more kinds selected from the group consisting of formic acid, boric acid, hydrochloric acid, zinc sulfate, sodium thiocyanate, citric acid, a brightener, a pH adjustor and a surface active agent. The other components are set as appropriate according to the type of Co plating bath.

The plating conditions such as the Co plating bath temperature, the pH of the Co plating bath, and the Co plating treatment time can be set as appropriate. For example, plating may be performed under conditions of a Co plating bath temperature of 25 to 70° C. and a pH of the Co plating bath of 1 to 5. In the case of electroplating, plating may be performed under conditions of a current density of 1 to 50 A/dm$^2$, and a Co plating treatment time of 1 to 50 seconds.

In the Co plating layer formation process, for example, a Co plating bath containing cobalt (II) sulfate heptahydrate: 240 to 330 g/L, boric acid: 20 to 55 g/L, formic acid: 15 to 30 g/L, and sulfuric acid: 0.5 to 3 g/L may be used. Using this Co plating bath, electroplating may be performed under conditions in which the pH of the Co plating bath is 1.0 to 3.0, the Co plating bath temperature is 50 to 60° C., the current density is 1 to 40 A/dm$^2$, and the Co plating treatment time is 1 to 30 seconds. By this means, a Co plating layer consisting of Co and impurities can be formed on the Ni plating layer.

The Co coating weight of the Co plating layer is the same as the aforementioned content of Co in the alloy layer 3. In other words, preferably the plating conditions are adjusted so that the Co coating weight per side of the steel sheet 2 falls within the range of 0.45 to 1.34 g/m$^2$.

In the present embodiment, by adjusting the conditions of the alloying heat treatment process and the temper rolling process, the surface roughness Ra1 of the alloy layer 3, the surface roughness Ra2 of the alloy layer 3, and the mean length of roughness RSm of the alloy layer 3 are adjusted to fall within an appropriate range. In other words, by performing the alloying heat treatment and the temper rolling under appropriate conditions, the surface roughness Ra1 of the surface of the alloy layer 3 in a case where the sampling length that is defined in JIS B0601 (2013) is set to 5.0 mm which is measured using a stylus-type surface roughness meter can be made 2.0 μm or less. By performing the alloying heat treatment and the temper rolling under appropriate conditions, furthermore, Ra2 that denotes the arithmetic mean height of a roughness curve of the surface of the alloy layer 3 over a sampling length of 10 μm in the width direction of the steel sheet 2 which is measured using an AFM can be made 20 nm or less, and RSm that denotes the mean length of the roughness curve elements can be made 700 nm or more. By this means, the occurrence of a change in the color of the alloy layer 3 can be suppressed.

[Alloying Heat Treatment Process]

In the alloying heat treatment process, the steel sheet 2 having the Ni plating layer and the Co plating layer is subjected to an alloying heat treatment. By performing the alloying heat treatment, Ni of the Ni plating layer, Co of the Co plating layer, and Fe contained in the steel sheet 2 diffuse with each other, and the alloy layer 3 is formed. A well-known heating furnace can be used as the alloying heat treatment furnace. The alloying heat treatment may be performed, for example, by continuously supplying the steel sheet 2 into the heating furnace. The atmospheric gas during the alloying heat treatment is not particularly limited, and for example is $N_2+2$ to 4% $H_2$.

Treatment temperature: 715 to 850° C.

If the treatment temperature during the alloying heat treatment is less than 715° C., mutual diffusion between Ni and Co will be insufficient. In this case, the adhesion of the alloy layer 3 will decrease. On the other hand, if the treatment temperature during the alloying heat treatment is more than 850° C., the hardness of the steel sheet 2 will decrease. Therefore, the treatment temperature during the alloying heat treatment is 715 to 850° C.

Alloying heat treatment time: 10 to 45 seconds

If the alloying heat treatment time is less than 10 seconds, mutual diffusion between Ni and Co will be insufficient. In this case, the adhesion of the alloy layer 3 will decrease. On the other hand, if the alloying heat treatment time is more than 45 seconds, the hardness of the steel sheet 2 will decrease. Therefore, the alloying heat treatment time is 10 to 45 seconds. Here, the term "alloying heat treatment time" refers to the holding time of the steel sheet 2 at the aforementioned treatment temperature during the alloying heat treatment.

The surface-treated steel sheet 1 with the alloy layer 3 formed by the alloying heat treatment is cooled. The cooling is performed by a well-known method. The cooling is, for example, gas cooling. The surface-treated steel sheet 1 may be cooled from the alloying heat treatment temperature to about 100° C. by gas cooling.

[Temper Rolling Process]

In the temper rolling process, on the assumption that the alloying heat treatment was performed under the aforementioned conditions, the steel sheet 2 is subjected to temper rolling under the following conditions. By this means, the surface roughness Ra1 of the alloy layer 3, the surface roughness Ra2 of the alloy layer 3, and the mean length of roughness RSm of the alloy layer 3 can be adjusted to be within an appropriate range.

Rolling reduction: 0.5 to 10.0%

If the rolling reduction is less than 0.5%, rolling will be insufficient and the surface roughness Ra1 of the alloy layer 3 will be too large. On the other hand, if the rolling reduction is more than 10.0%, it will not be possible to secure the sheet thickness required as a product, and furthermore the production efficiency will decrease. Accordingly, the rolling reduction is to be 0.5 to 10.0%. Here, the term "rolling reduction" refers to a numerical value obtained when an inlet sheet thickness h1 before the steel sheet 2 enters the rolling rolls and an outlet sheet thickness h2 after the steel sheet 2 exits from the rolling rolls are substituted into the following equation.

Rolling reduction (%)=$(h1-h2)/h1 \times 1.00$

Tension: 3.5 kgf/mm² or more

On the assumption that the alloying heat treatment was performed under the aforementioned alloying heat treatment conditions, and rolling was performed with a rolling reduction of 0.5 to 10.0%, the tension is to be 3.5 kgf/mm² or more. By this means, the straightening force of the surface shape of the alloy layer 3 is increased. As a result, the surface roughness Ra2 of the alloy layer 3 and the mean length of roughness RSm of the alloy layer 3 which are measured by an AFM can be made 20 nm or less and 700 nm or more, respectively. In other words, even if the tension is set to 3.5 kgf/mm² or more, if the rolling reduction is outside the range of 0.5 to 10.0%, the surface roughness Ra2 of the alloy layer 3 cannot be made 20 nm or less, and the mean length of roughness RSm of the alloy layer 3 cannot be made 700 nm or more. Further, even if the rolling reduction is 0.5 to 10.0%, if the tension is less than 3.5 kgf/mm², the surface roughness Ra2 of the alloy layer 3 cannot be made 20 nm or less, and the mean length of roughness RSm of the alloy layer 3 cannot be made 700 nm or more. Accordingly, the tension is to be 3.5 kgf/mm² or more. Although an upper limit of the tension is not particularly limited, for example the upper limit is 4.5 kgf/mm². Here, the term "tension" refers to tension in the rolling direction that is applied to the steel sheet 2 including the alloy layer 3 that is the object of rolling during temper rolling.

The surface-treated steel sheet 1 of the present embodiment can be produced by the production processes described above. Note that, the method for producing the surface-treated steel sheet 1 of the present embodiment may include another process in addition to the processes described above.

[Other Process]

An example of another process is a preparation process. The preparation process may be performed before the Ni plating process.

[Preparation Process]

A preparation process may be performed before the Ni plating process. In the preparation process, the surface of the prepared steel sheet 2 is subjected to pickling and/or alkaline degreasing, to thereby remove an oxide film and impurities at the surface of the steel sheet 2. As a result, the adhesion of the Ni plating layer increases. Further, plating electro-deposition defects of the Ni plating layer can be reduced.

Examples

Hereunder, advantageous effects of the surface-treated steel sheet of the present embodiment will be described more specifically by way of Examples. The conditions adopted in the following Examples are one example of conditions which are employed for confirming the workability and advantageous effects of the surface-treated steel sheet of the present embodiment. Accordingly, the surface-treated steel sheet of the present embodiment is not limited to this one example of the conditions.

[Steel Sheet Preparation Process]

Steel sheets consisting of aluminum-killed steel having a thickness of 0.30 mm were prepared. The steel sheets had a chemical composition consisting of C: 0.0090%, Si: 0.006%, Mn: 0.12%, P: 0.012%, S: 0.0088%, sot, Al: 0.047%, and N: 0.0025%, with the balance being Fe and impurities. The steel sheets were subjected to preparations consisting of alkaline degreasing and pickling.

[Ni Plating Process]

A Ni plating layer was formed on the surface of the respective steel sheets that had been subjected to the preparations. The Ni plating layer was formed on both sides of each steel sheet. The obtained Ni plating layer was a plating layer consisting of Ni and impurities. The Ni plating conditions for each test number are shown below.

TABLE 3

| | Ni Plating Bath Composition | | | | | Ni Plating Conditions | | |
|---|---|---|---|---|---|---|---|---|
| Test No. | Nickel (II) Sulfate Hexahydrate (g/L) | Nickel (II) Chloride Hexahydrate (g/L) | Boric Acid (g/L) | Ni Ions Concentration (g/L) | pH | Ni Plating Bath Temperature (° C.) | Current Density (A/dm$^2$) | Ni Plating Treatment Time (s) |
| 1 | 330 | 70 | 45 | 73 | 4.0 | 55 | 20 | 8.1 |
| 2 | 330 | 70 | 45 | 73 | 4.0 | 55 | 20 | 10.2 |
| 3 | 330 | 70 | 45 | 73 | 4.0 | 55 | 20 | 10.4 |
| 4 | 330 | 70 | 45 | 73 | 4.0 | 55 | 20 | 2.5 |
| 5 | 330 | 70 | 45 | 73 | 4.0 | 55 | 20 | 8.0 |
| 6 | 330 | 70 | 45 | 73 | 4.0 | 55 | 20 | 59.7 |
| 7 | 330 | 70 | 45 | 73 | 4.0 | 55 | 20 | 10.2 |
| 8 | 330 | 70 | 45 | 73 | 4.0 | 55 | 20 | 8.0 |
| 9 | 330 | 70 | 45 | 73 | 4.0 | 55 | 20 | 10.2 |
| 10 | 330 | 70 | 45 | 73 | 4.0 | 55 | 20 | 10.3 |
| 11 | 330 | 70 | 45 | 73 | 4.0 | 55 | 20 | 10.2 |
| 12 | 330 | 70 | 45 | 73 | 4.0 | 55 | 20 | 10.2 |

[Co Plating Process]

A Co plating layer was formed on the Ni plating layer. The Co plating layer was formed on both sides of the steel sheet. The obtained Co plating layer was a plating layer consisting of Co and impurities. The Co plating conditions for each test number are shown below. Note that, in Test Number 10 a Co plating layer was not formed.

TABLE 4

| | Co Plating Bath Composition | | | | | | Co Plating Conditions | | |
|---|---|---|---|---|---|---|---|---|---|
| Test No. | Cobalt (II) Sulfate Heptahydrate (g/L) | Boric Acid (g/L) | Formic Acid (g/L) | Sulfuric Acid (g/L) | Co Ions Concentration (g/L) | pH | Co Plating Bath Temperature (° C.) | Current Density (A/dm$^2$) | Co Plating Treatment Time (s) |
| 1 | 250 | 45 | 25 | 1.5 | 52 | 1.5 | 55 | 20 | 3.2 |
| 2 | 250 | 45 | 25 | 1.5 | 52 | 1.5 | 55 | 20 | 3.3 |
| 3 | 250 | 45 | 25 | 1.5 | 52 | 1.5 | 55 | 20 | 3.2 |
| 4 | 250 | 45 | 25 | 1.5 | 52 | 1.5 | 55 | 20 | 3.3 |
| 5 | 250 | 45 | 25 | 1.5 | 52 | 1.5 | 55 | 20 | 1.6 |
| 6 | 250 | 45 | 25 | 1.5 | 52 | 1.5 | 55 | 20 | 3.2 |
| 7 | 250 | 45 | 25 | 1.5 | 52 | 1.5 | 55 | 20 | 1.4 |
| 8 | 250 | 45 | 28 | 1.5 | 52 | 1.5 | 55 | 20 | 4.2 |
| 9 | 250 | 45 | 25 | 1.5 | 52 | 1.5 | 55 | 20 | 4.2 |
| 10 | — | — | — | — | — | — | — | — | — |
| 11 | 250 | 45 | 25 | 1.5 | 52 | 1.5 | 55 | 20 | 3.2 |
| 12 | 250 | 45 | 25 | 1.5 | 52 | 1.5 | 55 | 20 | 3.2 |

[Alloying Heat Treatment Process]

Steel sheets having an Ni plating layer and a Co plating layer, or having an Ni plating layer were subjected to a continuous alloying heat treatment in a N$_2$+2% H$_2$ atmosphere. The treatment temperature and the alloying treatment time in the alloying heat treatment of each test number are shown in Table 5. After undergoing the alloying heat treatment, the steel sheet was cooled to 100° C. using N$_2$ gas.

[Temper Rolling Process]

Each steel sheet after the alloying heat treatment and cooling was subjected to temper rolling. The rolling reduction and tension in the temper rolling were as shown in Table 5. The surface-treated steel sheet of each test number was produced by the above processes.

[Test to Measure Content of Ni and Content of Co in Alloy Layer]

The content of Ni and content of Co in the alloy layer of the surface-treated steel sheet of each test number were measured by the following method. The surface-treated steel sheet of each test number was cut in the thickness direction, and a cross section was Observed using a scanning electron microscope at a magnification of ×10000, and the thickness of the alloy layer was measured. Next, a disk-shaped sample having a diameter of 40 mm was extracted from the surface of the surface-treated steel sheet. The diameter of the sample was perpendicular to the thickness direction of the alloy layer. The thickness of the sample was the same as the thickness of the alloy layer that was measured earlier. The obtained sample was dissolved in a mixed acid of concentrated hydrochloric acid: concentrated nitric acid=1:1 at 25° C. The time of the dissolution treatment was set according to the thickness of the alloy layer and the size of the sample. The obtained solution was analyzed by high-frequency inductively coupled plasma (ICP) emission spectrometry (model number SPS-3500, manufactured by Hitachi High-Tech Corporation). The content of Ni (g/m$^2$) and the content of Co (g/m$^2$) in the alloy layer were determined based on the obtained results and the area of the sample. The results are shown in the columns "Ni Content (g/m$^2$)" and "Co Content (g/m$^2$)" in Table 5.

elements that is defined in JIS B0601 (2013). A profile curve obtained by measuring the surface of the surface-treated steel sheet of Test Number 2 using an AFM is shown in FIG.

TABLE 5

| | Alloying Heat Treatment Conditions | | Temper Rolling Conditions | | Alloy Layer | | Surface of Alloy Layer | | | Evaluation Results | |
|---|---|---|---|---|---|---|---|---|---|---|---|
| Test No. | Treatment Temperature (° C.) | Time (s) | Rolling Reduction (%) | Tension (kgf/mm$^2$) | Ni Content (g/m$^2$) | Co Content (g/m$^2$) | Ra1 (μm) | Ra2 (nm) | RSm (nm) | Impedance (Ω) | Color Difference (ΔE*) |
| 1 | 800 | 20 | 1.2 | 4.0 | 4.85 | 1.01 | 0.8 | 17 | 924 | 32 | 2.1 |
| 2 | 800 | 20 | 1.3 | 4.0 | 6.10 | 1.03 | 0.9 | 9 | 830 | 39 | 1.5 |
| 3 | 800 | 20 | 1.3 | 3.5 | 6.20 | 1.01 | 1.0 | 11 | 708 | 36 | 1.3 |
| 4 | 800 | 20 | 1.2 | 4.0 | 1.51 | 1.05 | 0.8 | 18 | 882 | 45 | 1.3 |
| 5 | 800 | 20 | 1.2 | 4.0 | 4.76 | 0.52 | 0.9 | 16 | 854 | 47 | 1.2 |
| 6 | 800 | 20 | 1.2 | 4.0 | 35.60 | 1.01 | 0.8 | 10 | 910 | 41 | 1.3 |
| 7 | 800 | 20 | 1.3 | 4.0 | 6.08 | 0.45 | 1.0 | 11 | 859 | 38 | 1.7 |
| 8 | 800 | 20 | 1.3 | 4.0 | 4.71 | 1.34 | 1.0 | 18 | 884 | 44 | 1.4 |
| 9 | 800 | 20 | 1.3 | 4.0 | 6.05 | 1.34 | 0.9 | 13 | 834 | 41 | 1.8 |
| 10 | 800 | 20 | 1.2 | 4.0 | 6.12 | — | 1.0 | 19 | 854 | 356 | 0.9 |
| 11 | 800 | 20 | 0.4 | 4.0 | 6.08 | 1.01 | 4.5 | 26 | 646 | 48 | 5.1 |
| 12 | 800 | 20 | 1.3 | 3.0 | 6.11 | 1.02 | 0.9 | 25 | 557 | 42 | 4.6 |

[Surface Roughness Measurement Test Using Stylus-Type Surface Roughness Meter]

The surface roughness of the alloy layer of the surface-treated steel sheet of each test number was measured using a stylus-type surface roughness meter. A stylus-type surface roughness meter (manufactured by Kosaka Laboratory Ltd., model number DR-100X63) as defined in JIS B0651 (2001) was used for the measurement. Based on JIS 80601 (2013), the sampling length was set to 5.0 mm, and the surface roughness Ra of the alloy layer of the surface-treated steel sheet 1 was measured in the width direction of the steel sheet. The term "width direction of the steel sheet" refers to a direction perpendicular to both the rolling direction of the steel sheet and the thickness direction of the steel sheet. The obtained result was defined as the surface roughness Ra1 (μm) of the alloy layer. The results are shown in Table 5.

[Surface Roughness and Mean Length Measurement Test Using Atomic Force Microscope (AFM)]

Figure 5:
FIG. 5 is a graph illustrating a profile curve obtained by measuring a surface of a surface-treated steel sheet of Test Number 11 using an AFM.

The surface roughness of the alloy layer of the surface-treated steel sheet of each test number was measured using an atomic force microscope (AFM). An atomic force microscope (manufactured by Hitachi High-Tech Corporation, model number AFM5500M) was used for the measurement. The measurement conditions were set as follows: measurement in the atmosphere; scan size: vertical 2 μm and horizontal 2 μm; and dynamic mode AFM. The arithmetic mean height of a roughness curve over a sampling length of 10 μm in the width direction of the steel sheet was determined. The term "width direction of the steel sheet" refers to a direction perpendicular to both the rolling direction of the steel sheet and the thickness direction of the steel sheet. The obtained result was defined as the surface roughness Ra2 (nm) of the alloy layer. Further, the mean length of roughness curve elements over the aforementioned sampling length of 10 μm was determined. The obtained result was defined as the mean length of roughness RSm (nm) of the alloy layer. The results are shown in Table 5. Here, the arithmetic mean height of the roughness curve was determined by the same method as the method for determining the arithmetic mean height of a roughness curve that is defined in JIS B0601 (2013). The mean length of roughness curve elements was determined by the same method as the method for determining the mean length of roughness curve 4. A profile curve obtained by measuring the surface of the surface-treated steel sheet of Test Number 11 using an AFM is shown in FIG. 5.

[Impedance Measurement Test]

The impedance value of the surface of the surface-treated steel sheet of each test number was measured. Specifically, the surface-treated steel sheet of each test number was held at a constant potential for 10 days at 0.3 V vs. Hg/HgO in a 35% KOH aqueous solution at 60° C. Here, 0.3 V vs. Hg/HgO is the potential of manganese dioxide in the positive electrode of a manganese battery. The impedance value at a frequency of 0.1 Hz of the surface-treated steel sheet after being held at the constant potential was measured. The measurement was performed using HZ-7000 manufactured by Hokuto Denko Co., Ltd. The results are shown in Table 5.

[Color Difference Measurement Test]

The surface-treated steel sheet of each test number was placed in a constant temperature and humidity testing machine (manufactured by Tokyo Rikakikai Co., Ltd, model number KCL-2000A), and held at a temperature of 40° C. and a humidity of 90% rh for 10 days. The L*a*b* values of the surface-treated steel sheet were measured before and after being held at the constant temperature and constant humidity. A spectrophotometer (manufactured by KONICA MINOLTA, INC., model number CM-2600D) was used for the measurement. The measurement conditions were as follows: sample size: 50 mm×100 mm, measurement diameter: φ6 mm, reflection, specular component treatment: SCE. A color difference (ΔE*) was determined based on the L*a*b* values before and after being held at the constant temperature and constant humidity. The results are shown in Table 5.

[Evaluation Results]

Figure 4:
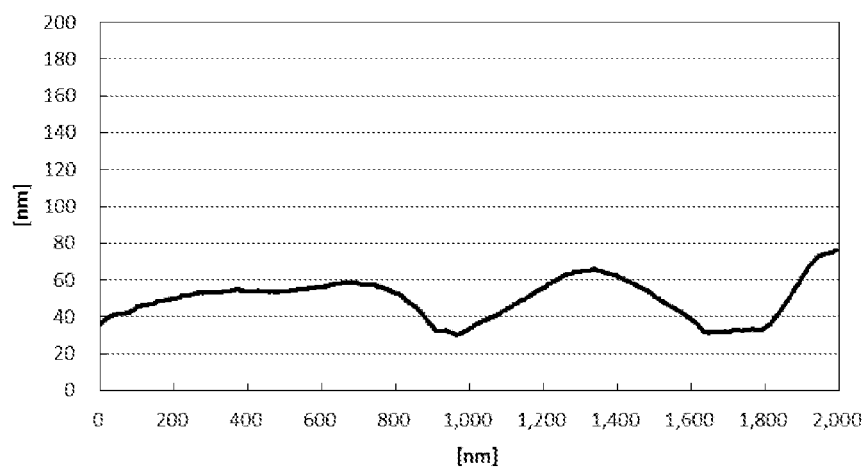
FIG. 4 is a graph illustrating a profile curve obtained by measuring a surface of a surface-treated steel sheet of Test Number 2 using an AFM.

Referring to Table 5 and FIG. 4, the surface-treated steel sheet of each of Test Number 1 to Test Number 9 included an alloy layer containing Ni and Co on the steel sheet surface, and the surface roughness Ra1 of the surface of the alloy layer when the sampling length was set to 5.0 mm as defined in JIS B0601 (2013) which was measured using a stylus-type surface roughness meter was 2.0 μm or less. In addition, in the surface-treated steel sheet of each of Test Number 1 to Test Number 9, on the surface of the alloy layer, Ra2 that denotes the arithmetic mean height of a roughness curve over a sampling length of 10 μm in the width direction of the steel sheet which was measured using an atomic force microscope was 20 nm or less, and RSm that denotes the mean length of roughness curve elements over the sampling length of 10 μm in the width direction of the steel sheet which was measured using an atomic force microscope was 700 nm or more. As a result, in the surface-treated steel sheet of each of Test Number 1 to Test Number 9, the impedance value (Ω) was 50 or less, and the color difference (ΔE*) between before and after being exposed to the constant temperature and constant humidity conditions was 4.5 or less. In the surface-treated steel sheet of each of Test Number 1 to Test Number 9, the contact resistance was low and it was possible to suppress the occurrence of a change in the color of the surface.

On the other hand, the surface-treated steel sheet of Test Number 10 did not include an alloy layer containing Ni and Co on the steel sheet surface, and instead included an alloy layer consisting of Ni and impurities on the steel sheet surface. As a result, the impedance value of the surface-treated steel sheet of Test Number 10 was 356Ω, and thus the contact resistance was high.

Although the surface-treated steel sheet of Test Number 11 included an alloy layer containing Ni and Co on the steel sheet surface, the surface roughness Ra1 of the alloy layer was 4.5 μm, the surface roughness Ra2 of the alloy layer was 26 nm, and the mean length of roughness RSm of the alloy layer was 646 nm. As a result, the color difference of the surface-treated steel sheet of Test Number 11 was 5.1, and thus the discoloration resistance was low.

Although the surface-treated steel sheet of Test Number 12 included an alloy layer containing Ni and Co on the steel sheet surface, and the surface roughness Ra1 of the alloy layer was 2.0 μm or less, the surface roughness Ra2 of the alloy layer was 25 nm and the mean length of roughness RSm of the alloy layer was 557 nm. As a result, the color difference of the surface-treated steel sheet of Test Number 12 was 4.6, and thus the discoloration resistance was low.

An embodiment of the present disclosure has been described above. However, the foregoing embodiment is merely an example for implementing the present disclosure. Accordingly, the present disclosure is not limited to the above embodiment, and the above embodiment can be appropriately modified within a range that does not deviate from the gist of the present invention.

REFERENCE SIGNS LIST

1 Surface-treated Steel Sheet
2 Steel Sheet
3 Alloy Layer
10 Positive electrode (Manganese Dioxide)
11 Negative electrode (Zinc)
12 Separator
13 Current Collector
14 Insulator
15 Positive electrode Terminal

The invention claimed is:

1. A surface-treated steel sheet, comprising:
a steel sheet, and
an alloy layer containing Ni and Co on a surface of the steel sheet,
wherein:
a surface roughness Ra1 of a surface of the alloy layer over a sampling length of 5.0 mm in a width direction of the steel sheet is 2.0 μm or less, the surface roughness Ra1 being as defined by JIS B0601 (2013) and measured using a stylus-type surface roughness meter; and
Ra2 that denotes an arithmetic mean height of a roughness curve of the surface of the alloy layer over a sampling length of 10 μm in the width direction of the steel sheet is 20 nm or less, and RSm that denotes a mean length of roughness curve elements of the surface of the alloy layer over a sampling length of 10 μm in the width direction of the steel sheet is 700 nm or more, Ra2 and RSm being measured using an atomic force microscope.

2. The surface-treated steel sheet according to claim 1, wherein:
per side of the steel sheet, a content of Ni in the alloy layer is 1.34 to 5.36 g/m$^2$, and a content of Co in the alloy layer is 0.45 to 1.34 g/m$^2$.

3. The surface-treated steel sheet according to claim 1, wherein:
per side of the steel sheet, a content of Ni in the alloy layer is 5.36 to 35.6 g/m$^2$, and a content of Co in the alloy layer is 0.45 to 1.34 g/m$^2$.

* * * * *